(12) United States Patent
Martin (10) Patent No.: US 11,766,738 B2
(45) Date of Patent: Sep. 26, 2023

(54) FRICTION STIR WELDING PROCESS (71) Applicant: BAE Systems plc, London (GB)

(72) Inventor: Jonathan Peter Martin, Great Abington (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 17/791,973

(22) PCT Filed: Jan. 13, 2021

(86) PCT No.: PCT/GB2021/050069
§ 371 (c)(1),
(2) Date: Jul. 11, 2022

(87) PCT Pub. No.: WO2021/144564
PCT Pub. Date: Jul. 22, 2021

(65) Prior Publication Data
US 2023/0052271 A1 Feb. 16, 2023

(30) Foreign Application Priority Data

Jan. 14, 2020 (EP) ........................... 20275006
Jan. 14, 2020 (GB) ........................... 2000512

(51) Int. Cl.
B23K 20/00 (2006.01)
B23K 20/12 (2006.01)

(52) U.S. Cl.
CPC .......... *B23K 20/1225* (2013.01); *B23K 20/124* (2013.01); *B23K 20/1255* (2013.01);
(Continued)

(58) Field of Classification Search
CPC .......... B23K 20/1265; B23K 20/122; B23K 20/1275;
(Continued)

(56) References Cited

U.S. PATENT DOCUMENTS 5,460,317 A * 10/1995 Thomas et al. ..... B23K 20/1255
228/2.1
8,220,693 B2 * 7/2012 Krajewski et al. ..... C23C 26/00
228/159
(Continued)

FOREIGN PATENT DOCUMENTS

CN 105478994 A 4/2016
JP H10193140 A 7/1998
(Continued)

OTHER PUBLICATIONS

International Preliminary Report on Patentability for PCT Appl. No. PCT/GB2021/050069 mail date Jul. 28, 2022, 8 pages.
(Continued)

*Primary Examiner* — Erin B Saad
(74) *Attorney, Agent, or Firm* — Maine Cernota & Rardin (57) ABSTRACT A method of friction-stir welding, FSW, a joint J, for example a T joint and/or a lap joint, between a first workpiece W1 and a second workpiece W2, is described. The method comprises: performing a first pass P1 of FSW of the joint J by moving therealong a first tool (10), comprising a first probe (100) rotating in a first rotational direction RD1, in a first movement direction MD1 defining a first line L1, on a first side S1 of the joint J, comprising: inserting the first probe (100) to a first depth D1, thereby providing a first welded region WR1; withdrawing at least partially the first probe (100), thereby providing a first partially welded and/or unwelded region PWUR1; and fully withdrawing the first probe (100), thereby resulting in a first exit hole EXH1; performing a second pass P2 of FSW of the joint J by moving therealong a second tool (20), comprising a second probe (200) rotating in a second rotational direction RD2, in a second movement direction MD2 defining a second line L2, on the first side S1 of the joint J, comprising: inserting the second probe (200) to a second depth D2, thereby providing a
(Continued)

second welded region WR2; optionally withdrawing at least partially the second probe (200); and fully withdrawing the second probe 200, thereby resulting in a second exit hole EXH2; wherein the second welded region WR2 includes the first exit hole EXH1; and wherein the second exit hole EXH2 is included in the first welded region WR1.

14 Claims, 4 Drawing Sheets

(52) U.S. Cl.
CPC .............................. *B23K 20/1265* (2013.01)

(58) Field of Classification Search
CPC ... B23K 20/12; B23K 20/1215; B23K 20/1225; B23K 20/123; B23K 20/1245; B23K 20/1255; B23K 20/126; B23K 20/128; B23K 20/129; B23K 2101/001; B23K 2103/04; B23K 2103/20; B23K 2103/26; B23K 26/032; B23K 26/034; B23K 26/0604; B23K 26/0673; B23K 26/28; B23K 35/286; B23K 35/3033; B23K 35/3046; B23K 35/3053; B23K 35/308; B23K 35/325; B23K 35/327
See application file for complete search history.

(56) References Cited

U.S. PATENT DOCUMENTS

| | | | | |
|---|---|---|---|---|
| 8,720,607 | B2* | 5/2014 | Davis et al. | C21D 1/06 175/57 |
| 8,840,006 | B2* | 9/2014 | Sayama et al. | B23K 20/12 228/2.1 |
| 8,881,964 | B2* | 11/2014 | Ren | C22C 38/28 228/2.1 |
| 9,999,940 | B2* | 6/2018 | Mialhe et al. | B23K 20/122 |
| 10,041,351 | B2* | 8/2018 | Zollinger et al. | F01D 5/063 |
| 2005/0139640 | A1* | 6/2005 | Kay | B23K 20/1265 428/615 |
| 2012/0125522 | A1* | 5/2012 | Kato et al. | B23K 20/123 228/102 |

FOREIGN PATENT DOCUMENTS

| | | | |
|---|---|---|---|
| JP | 4792271 | B2 | 10/2011 |
| JP | 2011218363 | A | 11/2011 |
| JP | 2012139731 | A | 7/2012 |

OTHER PUBLICATIONS

Combined Search and Examination Report for GB Patent Appl. No. GB2100402.3 mail date Jul. 5, 2021, 7 pages.
Extended European Search Report for EP Patent Appl. No. EP20275006.3 mail date Jul. 1, 2020, 7 pages.
Internation Search Report and Written Opinion for PCT Appl. No. PCT/GB2021/050069 mail date May 18, 2021, 10 pages.
Search Report for GB Patent. Appl. No. GB2000512.0 mail date May 26, 2020, 6 pages.
Thomas et al., "The Simultaneous Use of Two or More Friction Stir Welding Tools", The Welding Institute, Online, Available from; https://www.twi-global.com/technical-knowledge/published-papers/the-simultaneous-use-of-two-or-more-friction-stir-welding-tools-january-2005 [ Accessed; Sep. 17, 2022, Published; Mar. 1, 2005].

* cited by examiner

FRICTION STIR WELDING PROCESS

FIELD OF THE INVENTION

The present invention relates to friction-stir welding.

BACKGROUND TO THE INVENTION

Friction stir welding (FSW) (also known as stake friction stir welding and friction stir stake welding) is a solid-state joining process that uses a non-consumable rotating tool to join two facing workpieces without melting the workpieces. The rotating tool is in contact with the workpiece(s) and mechanical pressure is applied via the rotating tool onto the workpiece(s). Heat is thus generated by friction between the rotating tool and the workpiece(s), resulting in a softened region of material of the workpiece(s) proximal the rotating tool. As the rotating tool traverses along the joint between the workpieces, the rotating tool mechanically intermixes the hot and softened material of the workpieces and forges this material by the mechanical pressure applied by the rotating tool thereupon.

FSW may be associated with several advantages, including good mechanical properties of the weld in the as-welded condition, improved welding safety, reduced consumable usage, amenable to automation, suitable for welding in all positions (i.e. flat, horizontal, vertical, and overhead), good weld appearance, thinner joints and/or lower environmental impact.

However, FSW may also be associated with several disadvantages, including an exit hole where the rotating tool is withdrawn, the need for large forces for the applied mechanical pressure, less suitable for dissimilar workpiece thicknesses and/or non-linear welds, slower weld speeds and/or restricted to certain joint types and/or geometries.

Hence, there is a need to improve FSW.

SUMMARY OF THE INVENTION

It is one aim of the present invention, amongst others, to provide a method of friction-stir welding, a method of manufacturing a component, a friction-stir welded joint, a component and an apparatus for friction-stir welding a joint which at least partially obviates or mitigates at least some of the disadvantages of the prior art, whether identified herein or elsewhere. For instance, it is an aim of embodiments of the invention to provide a method of friction-stir welding that reduces an effect due to an exit hole. For instance, it is an aim of embodiments of the invention to provide a method of manufacturing a component that provides more homogeneous friction-stir welds. For example, it is an aim of embodiments of the invention to provide a component comprising a friction-stir welded joint having improved mechanical properties. For example, it is an aim of embodiments of the invention to provide an apparatus for friction-stir welding a joint that provides improved friction-stir welding.

A first aspect provides a method of friction-stir welding, FSW, a joint between a first workpiece and a second workpiece, the method comprising:
performing a first pass of FSW of the joint by moving therealong a first tool, comprising a first probe rotating in a first rotational direction, in a first movement direction defining a first line, on a first side of the joint, comprising: inserting the first probe to a first depth, thereby providing a first welded region; withdrawing partially the first probe, thereby providing a first partially welded and/or unwelded region; and fully withdrawing the first probe, thereby resulting in a first exit hole;
performing a second pass of FSW of the joint by moving therealong a second tool, comprising a second probe rotating in a second rotational direction, in a second movement direction defining a second line, on the first side of the joint, comprising: inserting the second probe to a second depth, thereby providing a second welded region; and fully withdrawing the probe, thereby resulting in a second exit hole;
wherein the second welded region includes the first exit hole;
wherein the second exit hole is included in the first welded region;
wherein withdrawing partially the first probe comprises withdrawing the first probe from the first depth while moving the first tool in the first movement direction;
wherein inserting the second probe to the second depth comprises inserting the second probe proximal to and/or into the first exit hole; and
wherein the second welded region includes the first partially welded and/or unwelded region.

A second aspect provides a method of manufacturing a component, preferably an aircraft component, comprising the method of friction-stir welding, FSW, a joint, for example a T joint and/or a lap joint, between a first workpiece and a second workpiece, according to the first aspect.

A third aspect provides a friction-stir welded, FSW, joint, for example a T joint and/or a lap joint, between a first workpiece and a second workpiece, provided according to the method of the first aspect.

A fourth aspect provides a component, preferably an aircraft component, comprising a friction-stir welded, FSW, joint according to the third aspect.

A fifth aspect provides an apparatus for friction-stir welding, FSW, a joint, for example a T joint and/or a lap joint, between a first workpiece and a second workpiece, the apparatus comprising:
a first tool, comprising a first probe rotatable in a first rotational direction and insertable into the first workpiece and/or into the second workpiece to a first depth and withdrawable therefrom, moveable in a first movement direction defining a first line, for performing a first pass of FSW of the joint by moving therealong thereby providing a first welded region, a first partially welded and/or unwelded region and a first exit hole; and
a second tool, comprising a second probe rotatable in a second rotational direction and insertable into the first workpiece and/or into the second workpiece to a second depth and withdrawable therefrom, moveable in a second movement direction defining a second line, for performing a second pass of FSW of the joint by moving therealong thereby providing a second welded region and a second exit hole;
wherein the second welded region includes the first exit hole; and
wherein the second exit hole is included in the first welded region.

DETAILED DESCRIPTION OF THE INVENTION

According to the present invention there is provided a method of friction-stir welding, as set forth in the appended claims. Also provided is a method of manufacturing a component, a friction-stir welded joint, a component and an apparatus for friction-stir welding a joint. Other features of the invention will be apparent from the dependent claims, and the description that follows.

Method of Friction Stir Welding

The first aspect provides a method of friction-stir welding, FSW, a joint, for example a T joint and/or a lap joint, between a first workpiece and a second workpiece, the method comprising:

performing a first pass of FSW of the joint by moving therealong a first tool, comprising a first probe rotating in a first rotational direction, in a first movement direction defining a first line, on a first side of the joint, comprising: inserting the first probe to a first depth, thereby providing a first welded region; withdrawing partially the first probe, thereby providing a first partially welded and/or unwelded region; and fully withdrawing the first probe, thereby resulting in a first exit hole;

performing a second pass of FSW of the joint by moving therealong a second tool, comprising a second probe rotating in a second rotational direction, in a second movement direction defining a second line, on the first side of the joint, comprising: inserting the second probe to a second depth, thereby providing a second welded region; optionally withdrawing partially the second probe; and fully withdrawing the second probe, thereby resulting in a second exit hole;

wherein the second welded region includes the first exit hole;

wherein the second exit hole is included in the first welded region;

wherein withdrawing partially the first probe comprises withdrawing the first probe from the first depth while moving the first tool in the first movement direction;

wherein inserting the second probe to the second depth comprises inserting the second probe proximal to and/or into the first exit hole; and wherein the second welded region includes the first partially welded and/or unwelded region.

In this way, deleterious effects due to the first exit hole, associated with the first pass of FSW of the joint, are reduced and/or eliminated since the second welded region, associated with the second pass of FSW, includes the first exit hole. Furthermore, since the second exit hole, associated with the second pass of FSW, is included in the first welded region, associated with the first pass of FSW, deleterious effects due to the second exit hole are reduced and/or eliminated.

In other words, the method according to the first aspect involves "stake" friction stir welding by piercing an external skin (i.e. the first workpiece) with a stir tool (i.e. the first tool) such that the depth of penetration of the probe is sufficient to weld the skin to an underlying sub-structure (i.e. the second workpiece), such as a spar or a rib. As usual for FSW, the method requires adequate support for the sub-structure and associated tooling such that the forces involved do not cause unacceptable deformation of the workpieces. Generally, stake friction stir welding will result in an entry hole (i.e. a first entry hole or a second entry hole, associated with the first pass of FSW and the second pass of FSW, respectively) that will 'self-heal' as the weld progresses away from the initial point of entry (i.e. the entry hole). However, conventionally, where the weld terminates there is usually an exit hole (i.e. the first exit hole or the second exit hole) corresponding to the shape and/or size of the weld probe 'pin' (i.e. the first probe or the second probe). The method according to the first aspect mitigates the problem of exit holes by first welding (i.e. the first pass of FSW) in one direction (i.e. the first movement direction) and reducing, for example gradually, the depth of the penetration by progressively withdrawing the weld probe pin (i.e. the first probe) such that the exit hole (i.e. the first exit hole) produced is sufficiently small to fit within a surplus landing on the outside of the skin (i.e. the first workpiece). This landing thickness may typically be approximately 1 mm, for example. The transition from full-depth weld (i.e. the first depth) to a reduced depth of stake weld as a result of gradually withdrawing the pin (i.e. the first probe) will normally result in no weld being present at the interface (i.e. the first partially welded and/or unwelded region), requiring of remedy. The remedy is to re-weld this section of under-penetrated weld (i.e. the first partially welded and/or unwelded region) by commencing the piercing of the second weld (i.e. the second entry hole) proximal and/or at the location of the initial exit hole (i.e. the first exit hole) from the first weld (i.e. the first pass of FSW) and re-welding in the opposite direction (i.e. the second movement direction) at the full depth (i.e. the second depth) in order to achieve a good weld (i.e. the second welded region). Re-piercing into the trace exit hole (i.e. the first exit hole) from the first weld (i.e. the first pass of FSW) can be done conventionally in a manner that achieves a self-healing entry hole. Once the desired length of full-depth weld has been achieved, for example covering the entire passage where the weld pin was being progressively withdrawn (i.e. the first partially welded and/or unwelded region), the weld pin (i.e. the second probe) is then, optionally, progressively withdrawn such that the final exit position (i.e. the second exit hole) still lies within the track of the first good weld (i.e. the first welded region). By optionally withdrawing partially the second probe, the external landing of the second pass of FSW may then be machined to remove all traces of the minor exit hole (i.e. the second exit hole) from the second weld pass (i.e. the second pass of FSW). The process can use either a 'rotating shoulder' or a 'stationary shoulder' friction weld tool, as described below. In the case of a stationary shoulder tool, the thickness of the surplus landing will need to be greater to ensure that there is sufficient volume of surplus material to fill the second exit hole during the transition phase when the weld tool probe pin is being withdrawn. The method according to the first aspect provides a means of achieving a fully-healed series of exit holes in stake welds (i.e. FSW welds) without compromising the effectiveness of the weld.

Friction Stir Welding

Generally, a rotating cylindrical tool, having a profiled probe pin, is fed (i.e. inserted) into a joint between two clamped workpieces, until the shoulder of the tool, which has a larger diameter than the pin, contacts the surface of the workpieces. The probe pin is slightly shorter than the weld depth required (i.e. the first depth and/or the second depth), when the tool shoulder contacts the surface of the workpieces. After a short dwell time, the rotating tool is moved forward along the joint line at a pre-set welding speed.

Frictional heat is generated between the rotating, moving tool and the workpieces. This heat, along with that generated by the mechanical mixing process and adiabatic heating within the material, causes the stirred materials to soften without melting. As the rotating tool is moved forward, a particular profile of the probe pin forces plasticised material from the leading face to the rear, where the high forces assist in forged consolidation of the weld.

This process of the rotating tool moving along the weld line in a plasticised tubular shaft of metal results in solid-state deformation of the workpieces, involving dynamic recrystallization of the materials.

In conventional FSW (CFSW), the tool includes a rotating shoulder. The rotating shoulder adds a relatively large amount of heat to the surface, which in turn leads to a relatively wider heat affected zone (HAZ).

In stationary shoulder friction stir welding (SSFSW), the probe rotates and protrudes through a hole in a stationary shoulder/slide component. The stationary shoulder adds some heat to the surface (due to friction of the shoulder rubbing against the surface) but the majority of the heat is provided by the probe and the weld is made with an essentially linear heat input profile, which in turn leads to a relatively narrower HAZ. The key welding mechanism comprises a rotating pin running through a non-rotating (i.e. stationary) shoulder component, which slides over the surface of the material during welding. The weld surface is very smooth, almost polished, with no or minimal reduction in cross-section.

Microstructure

The solid-state nature of FSW, combined with the particular shape and asymmetric speed profile of the rotating tool, results in a highly characteristic microstructure.

The microstructure can be divided up into the following zones:
- The stir zone (also known as the dynamically recrystallised zone) is a region of heavily deformed material that approximately corresponds to the location of the probe pin during welding. The grains within the stir zone are roughly equiaxed and often an order of magnitude smaller than the grains in the parent material of the workpieces. A unique feature of the stir zone is the common occurrence of several concentric rings, which has been referred to as an "onion-ring" structure. The precise origin of these rings has not been firmly established, although variations in particle number density, grain size and texture have all been suggested.
- The flow arm zone is on the upper surface of the weld and comprises material that is dragged by the shoulder from the retreating side of the weld, around the rear of the tool, and deposited on the advancing side.
- The thermo-mechanically affected zone (TMAZ) occurs on either side of the stir zone. In this region, the strain and temperature are lower and the effect of welding on the micro-structure is correspondingly less. Unlike the stir zone, the microstructure is recognizably that of the parent material, albeit deformed and rotated. Although the term TMAZ refers to the entire deformed region, it is often used to describe any region not covered by the terms stir zone and flow arm.
- The heat-affected zone (HAZ) is common to all welding processes. The HAZ is subjected to a thermal cycle but is not deformed during welding. The temperatures are lower than those in the TMAZ but may still have a significant effect if the micro-structure is thermally unstable. In age-hardened aluminium alloys, for example, this region commonly exhibits the poorest mechanical properties.

Forces

During welding, multiple forces will act on the tool:
1. An axial force, with respect to the tool, is necessary to maintain the position of the tool at or below the material surface. Some friction-stir welding machines operate under load control, but in many cases the vertical position of the tool is preset, and so the load will vary during welding.
2. A transverse force acts parallel to the tool motion and is positive in the transverse direction. Since this force arises as a result of the resistance of the material to the motion of the tool, it might be expected that this force will decrease as the temperature of the material around the tool is increased.
3. A lateral force may act perpendicular to the tool traverse direction and is defined herein as positive towards the advancing side of the weld.
4. Torque is required to rotate the tool, the amount of which will depend on the axial force and friction coefficient (sliding friction) and/or the flow strength of the material in the surrounding region (stiction).

Method of Friction Stir Welding

The method is of friction-stir welding, FSW, the joint, for example a T joint and/or a lap joint, between the first workpiece and the second workpiece. FSW is known. It should be understood that the joint mutually joins the first workpiece and the second workpiece. It should be understood that the first workpiece and the second workpiece are generally different workpieces i.e. before FSW. However, the method of FSW may be applied to a single workpiece, for example to provide welded regions therein having different properties, for example, compared with unwelded regions.

It should be understood that the joint is formed at an intersection between the first workpiece and the second workpiece. In one example, the joint comprises and/or is a square butt joint, an edge butt joint, a T butt joint, a lap joint, a multiple lap joint, a T lap joint or a fillet joint, for example a T joint and/or a lap joint, a multiple lap joint and/or a T lap joint. In one example, a position of the FSW, for example of the first pass of FSW and/or of the second pass of FSW, is flat, horizontal, vertical, and/or overhead.

The method comprises performing the first pass of FSW of the joint by moving therealong the first tool, comprising the first probe rotating in the first rotational direction, in the first movement direction defining the first line, on the first side of the joint. It should be understood that the first pass of FSW is an initial pass (also known as run) of the joint between the first workpiece and the second workpiece. It should be understood that the movement of the first tool is relative to the first workpiece and/or the second workpiece. For example, the first workpiece and the second workpiece may be static (i.e. stationary, not moving), such as fixedly clamped, and the first tool moves in the first movement direction, such as FSW of a lap joint between two plates. For example, the first workpiece and the second workpiece may move in the first movement direction, such as on a moving bed or on a rotator, and the first tool is static, such as FSW of a circumferential joint between two pipes. It should be understood that the first tool moves along the joint while the first probe is rotating, in the first movement direction. It should be understood that the first side of the joint is the side from which the first probe is inserted. For example, a lap joint or a multiple lap join may be FSW from the first side or an opposed second side, by inverting the workpieces. Generally, however, a T lap joint may only be welded from the first side, unless the second workpiece is relatively thin compared with the first depth.

In one example, the first rotational direction is clockwise or anticlockwise, as viewed from above the first tool. In one example, the first movement direction comprises and/or is a first translational direction. In one example, the first line is arcuate (i.e. a curved line) or linear (i.e. a straight line), preferably linear. In one example, the first line is substantially parallel, parallel, intersecting with and/or coincident with the joint, preferably coincident with the joint.

Performing the first pass of FSW comprises inserting the first probe to the first depth, thereby providing the first welded region. It should be understood that inserting the first probe results in a first entry hole, while is then 'healed' by the FSW as the first tool is moved in the first movement direction. It should be understood that inserting the first probe to the first depth is generally before the first probe begins moving in the first direction. It should be understood that the first depth is sufficient to provide the first welded region (i.e. of the joint between the first workpiece and the second workpiece) and thus depends, at least in part, on a thickness of the first workpiece, for example, as known by the skilled person. In one example, the first welded region extends along a first length of the first line.

In one example, inserting the first probe to the first depth results in a first entry hole. In one example, the method comprises moving the first tool in the first movement direction from the first entry hole towards and/or to the first exit hole, for example at a first speed.

Performing the first pass of FSW comprises withdrawing partially the first probe, thereby providing the first partially welded and/or unwelded region. It should be understood that the first probe is withdrawn while moving the first tool in the first movement direction. It should be understood that the first probe is withdrawn from the first depth to a relatively shallower depth (i.e. relatively more proximal the surface of the first workpiece, for example). The relatively shallower depth is insufficient to provide a welded region between the first workpiece and the second workpiece - rather, the first partially welded and/or unwelded region is instead provided. In one example, the first partially welded and/or unwelded region extends along a second distance of the first line.

In one example, withdrawing partially the first probe comprises gradually, for example linearly as a function of distance and/or time, withdrawing partially the first probe. In one example, withdrawing partially the first probe comprises withdrawing the first probe by an amount of at least 50%, preferably at least 75%, more preferably at least 90% of the first depth.

In one example, withdrawing partially the first probe comprises withdrawing the first probe from the first depth while moving the first tool in the first movement direction.

Performing the first pass of FSW comprises fully withdrawing the first probe, thereby resulting in the first exit hole. It should be understood that fully withdrawing the first probe is generally after the first probe has stopped moving in the first direction.

That is, performing the first pass of FSW comprises inserting the first probe into the first workpiece, for example, to the first depth, resulting in a first entry hole, moving the first probe in the first movement direction, thereby providing the first welded region including 'healing' the first entry hole, before partially withdrawing the first probe, thereby providing the first partially welded and/or unwelded region and then fully withdrawing the first probe, thereby resulting in the first exit hole.

The method comprises performing the second pass of FSW of the joint by moving therealong the second tool, comprising the second probe rotating in the second rotational direction, in the second movement direction defining the second line, on the first side of the joint. It should be understood that the second pass of FSW is subsequent to (i.e. after) the first pass of FSW, for example without any other intervening passes. It should be understood that the movement of the first tool is relative to the first workpiece and/or the second workpiece, as described with respect to the first tool. It should be understood that the second tool moves along the joint while the second probe is rotating, in the second movement direction. It should be understood that the first side of the joint is the side from which the second probe and the first probe is inserted (i.e. the same side). In one example, the second line is substantially parallel, parallel, intersecting with and/or coincident with the joint, preferably coincident with the joint. In one example, the second line is substantially parallel, parallel, intersecting with and/or coincident with the first line, preferably coincident with the first line.

In one example, the second rotational direction is clockwise or anticlockwise, as viewed from above the second tool. In one example, the second movement direction comprises and/or is a second translational direction. In one example, the second line is arcuate (i.e. a curved line) or linear (i.e. a straight line), preferably linear. In one example, the first rotational direction and the second rotational direction are the same rotational direction, for example both clockwise or both anticlockwise. In one example, the first rotational direction and the second rotational direction are mutually opposed, for example one clockwise or and the other anticlockwise. Using the same rotational direction may make the FSW susceptible to cold lap defect (CLD). However, if the second movement direction is opposed, for example, to the first movement direction, using the same rotational direction may mitigate susceptibility to cold lap defect.

Performing the second pass of FSW comprises inserting the second probe to the second depth, thereby providing the second welded region. It should be understood that inserting the second probe results in a second entry hole, while is then 'healed' by the FSW as the second tool is moved in the second movement direction. It should be understood that inserting the second probe to the second depth is generally before the second probe begins moving in the second direction. It should be understood that the second depth is sufficient to provide the second welded region (i.e. of the joint between the second workpiece and the second workpiece) and thus depends, at least in part, on a thickness of the first workpiece, for example, as known by the skilled person. In one example, the seconded welded region extends along a first length of the second line. In one example, the first length of the second line extends along, fully along and/or beyond the second length of the first line.

In one example, inserting the second probe to the second depth results in a second entry hole. In one example, the method comprises moving the second tool in the second movement direction from the second entry hole towards and/or to the second exit hole, for example at a second speed.

In one example, inserting the second probe to the second depth comprises inserting the second probe proximal to and/or into the first exit hole. That is, the second entry hole may be coincident and/or substantially coincident with the first exit hole, notwithstanding that the first exit hole has a relatively shallow depth compared with the first depth and/or the second depth.

Performing the second pass of FSW comprises optionally withdrawing partially the second probe. It should be understood that the second probe is optionally withdrawn while moving the second tool in the second movement direction. It should be understood that the second probe is withdrawn from the second depth to a relatively shallower depth (i.e. relatively more proximal the surface of the first workpiece, for example). The relatively shallower depth is insufficient to provide a welded region between the second workpiece and the second workpiece - rather, the second partially and/or unwelded region is instead provided.

In one example, withdrawing partially the second probe comprises gradually, for example linearly as a function of distance and/or time, withdrawing partially the second probe. In one example, withdrawing partially the second probe comprises withdrawing the second probe by an amount of at least 50%, preferably at least 75%, more preferably at least 90% of the second depth.

In one example, withdrawing partially the second probe comprises withdrawing the second probe from the second depth while moving the second tool in the second movement direction.

In one example, the first depth and the second depth are similar, for example the same.

Performing the second pass of FSW comprises fully withdrawing the second probe, thereby resulting in the second exit hole. It should be understood that fully withdrawing the second probe is generally after the second probe has stopped moving in the second direction.

The second movement direction is opposed to the first movement direction. That is, the first movement direction and the second movement direction are mutually opposed directions, for example along the first line and/or the second line, such as between the first entry hole and the first exit hole, the second entry hole and the second exit hole and/or between the first exit hole and the second exit hole, notwithstanding that the first line and the second line may be arcuate and/or linear. In one example, the second movement direction is directly opposed to the first movement direction. In one example, the second movement direction is opposed to the first movement direction within 30°, preferably within 20°, more preferably within 10°. In one example, the second line is at least partially coincident, preferably fully coincident, with the first line.

The second welded region includes the first exit hole. That is, the first exit hole is 'healed', reduced and/or eliminated by the second pass of FSW.

That is, performing the second pass of FSW comprises inserting the second probe into the first workpiece, for example, to the second depth, resulting in a second entry hole, moving the second probe in the second movement direction, thereby providing the second welded region including 'healing' the second entry hole and the first exit hole, before optionally partially withdrawing the second probe, and then fully withdrawing the second probe, thereby resulting in the second exit hole, for example in the first welded region.

In other words, the second welded region and the first welded region overlap, at least partially, such that the first exit hole is 'healed' by the second pass of FSW, providing the second welded region.

In one example, the first welded region is included in the second welded region. For example, the second welded region may overlap, for example fully overlap, the first welded region. In one example, the first partially welded and/or unwelded region is included in the second welded region. For example, the second welded region may overlap, for example fully overlap, the partially and/or unwelded region. In this way, the first partially welded and/or unwelded region is welded.

In one example, the first tool and/or the second tool comprises a rotating shoulder or a stationary shoulder, as described above. In one example, the first probe comprises and/or is a straight cylindrical probe, a threaded cylindrical probe, a tapered cylindrical probe, a square probe, a triangle probe, a whorl probe, a MX triflute probe, a flared triflute probe, a A-skew probe and/or a re-stir probe. Other probes are known.

In one example, the second tool is the first tool. That is, the first tool and the second tool are the same tool. In this way, the first tool is moved in the first movement direction and subsequently, in the second movement direction.

In one example, the first workpiece and/or the second workpiece comprises an aluminium alloy, for example a 2XXX, a 5XXX, a 6XXX, a 7XXX and/or an 8XXX aluminium alloy, preferably a 2XXX and/or a 7XXX aluminium alloy, a titanium alloy, a copper alloy and/or a steel. That is, the first workpiece and the second workpiece may be similar or dissimilar.

In one example, the first workpiece and/or the second workpiece has a thickness in a range from 0.5 mm to 25 mm, preferably in a range from 1.6 mm to 20 mm, more preferably in a range from 2 mm to 15 mm. For example, the first workpiece may be a skin of an aircraft and the second workpiece may be a spar or a rib.

Method of Manufacturing

The second aspect provides a method of manufacturing a component, preferably an aircraft component, comprising the method of friction-stir welding, FSW, a joint, for example a T joint and/or a lap joint, between a first workpiece and a second workpiece, according to the first aspect.

The FSW, the joint, the first workpiece and/or the second workpiece may be as described with respect to the first aspect.

In one example, the component is an airframe component, for example a fuselage, a wing, an empennage and/or a part thereof.

Friction Stir Welded Joint

The third aspect provides a friction-stir welded, FSW, joint, for example a T joint and/or a lap joint, between a first workpiece and a second workpiece, provided according to the method of the first aspect.

The FSW, the joint, the first workpiece and/or the second workpiece may be as described with respect to the first aspect.

Component

The fourth aspect provides a component, preferably an aircraft component, comprising a friction-stir welded, FSW, joint according to the third aspect.

In one example, the component is an airframe component, for example a fuselage, a wing, an empennage and/or a part thereof.

Apparatus for Friction Stir Welding

The fifth aspect provides an apparatus for friction-stir welding, FSW, a joint, for example a T joint and/or a lap joint, between a first workpiece and a second workpiece, the apparatus comprising:
 a first tool, comprising a first probe rotatable in a first rotational direction and insertable into the first workpiece and/or into the second workpiece to a first depth and withdrawable therefrom, moveable in a first movement direction defining a first line, for performing a first pass of FSW of the joint by moving therealong thereby providing a first welded region, a first partially welded and/or unwelded region and a first exit hole; and a second tool, comprising a second probe rotatable in a second rotational direction and insertable into the first workpiece and/or into the second workpiece to a second depth and withdrawable therefrom, moveable in a second movement direction defining a second line, for performing a second pass of FSW of the joint by moving therealong thereby providing a second welded region and a second exit hole;

wherein the second welded region includes the first exit hole; and wherein the second exit hole is included in the first welded region.

The FSW, the joint, the first workpiece, the second workpiece, the first tool, the first probe, the first rotational direction, the first depth, the first movement direction, the first line, the first pass of FSW, the first welded region, the first partially welded and/or unwelded region, the first exit hole, the second tool, the second probe, the second rotational direction, the second depth, the second movement direction, the second line, the second pass of FSW, the second welded region, and/or the second exit hole may be as described with respect to the first aspect.

In one example, the first tool and the second tool are the same tool. In this way, the first tool is moved in the first movement direction and subsequently, in the second movement direction.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION

Figure 1:
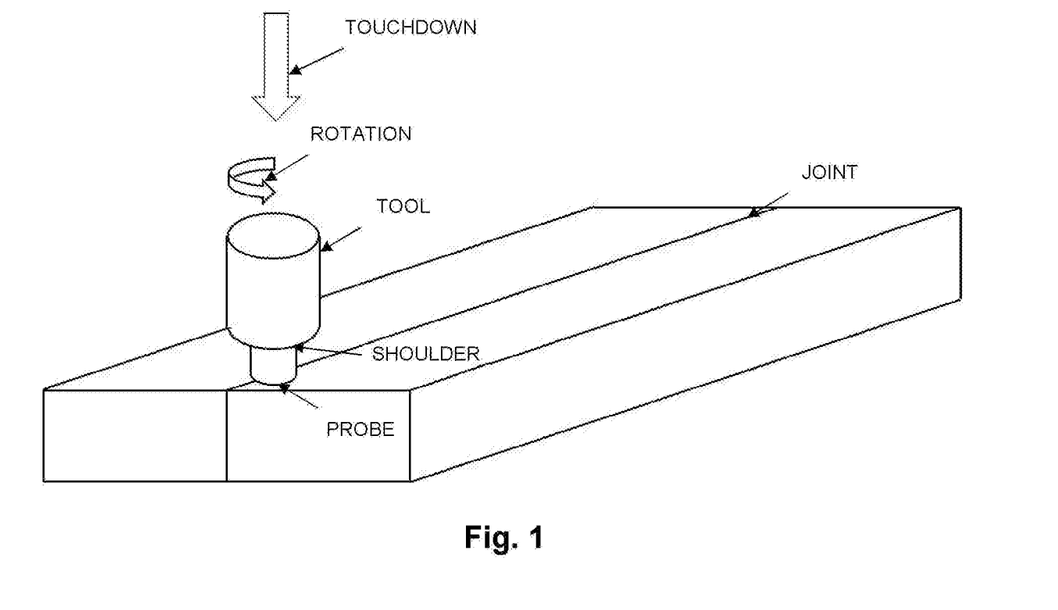
FIGS. 1 to 3 schematically depict a method of friction stir welding.
Figure 2:
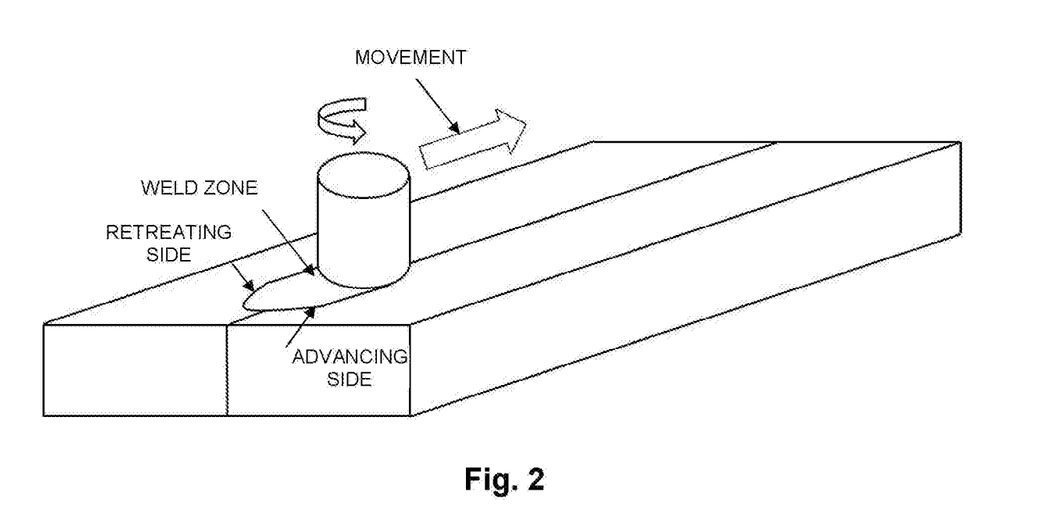
Figure 3:
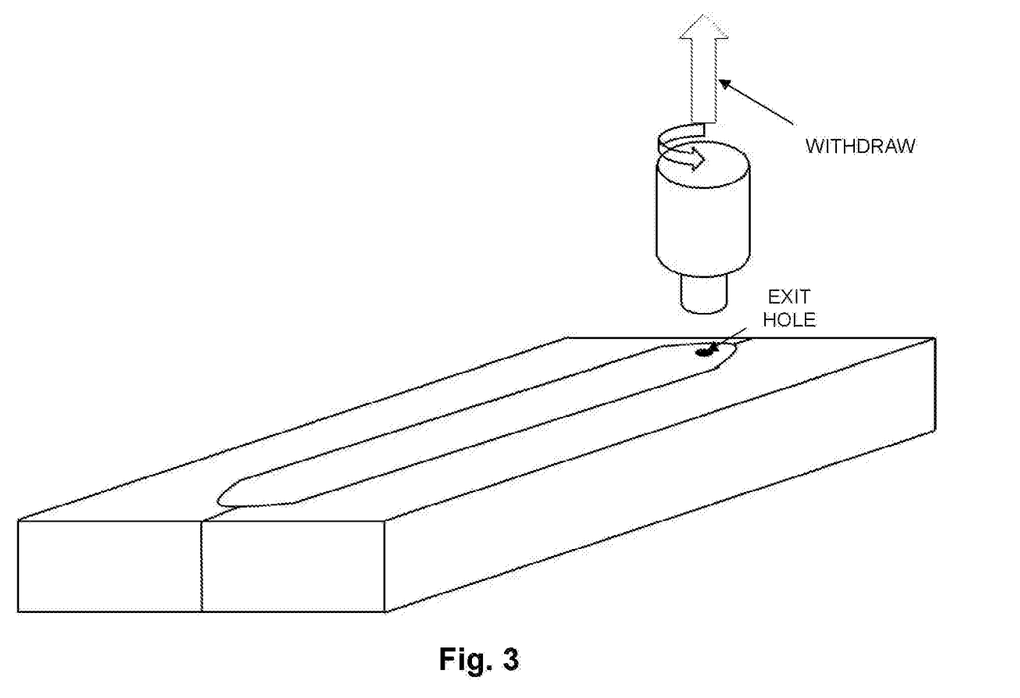

FIGS. 1 to 3 schematically depict a method of friction stir welding.

As shown in FIG. 1, an anticlockwise rotating probe of a FSW tool is inserted at the start (touchdown) into a butt joint between first and second workpieces, to a first depth, such that a shoulder of the tool is in contact with the first and second workpieces.

As shown in FIG. 2, the tool is moving in the direction of movement of the tool, as shown, providing a weld zone. An advancing side of the weld is where the direction of movement of the tool, as shown, and the direction of rotation of the probe are in the same general directions. A retreating side of the weld is where the direction of movement of the tool and the direction of rotation of the probe are in the opposite general directions.

As shown in FIG. 3, the tool is withdrawn at the stop, resulting in an exit hole.

Suitable probes for FSW include (a) a straight cylindrical probe; (b) a threaded cylindrical probe; (c) a tapered cylindrical probe; (d) a square probe; (e) a triangle probe; (f) a whorl (TM) probe; (g) a MX triflute (TM) probe; (h) a flared triflute (TM) probe; (i) an A-skew (TM) probe; and (j) a re-stir (TM) probe.

Figure 4:
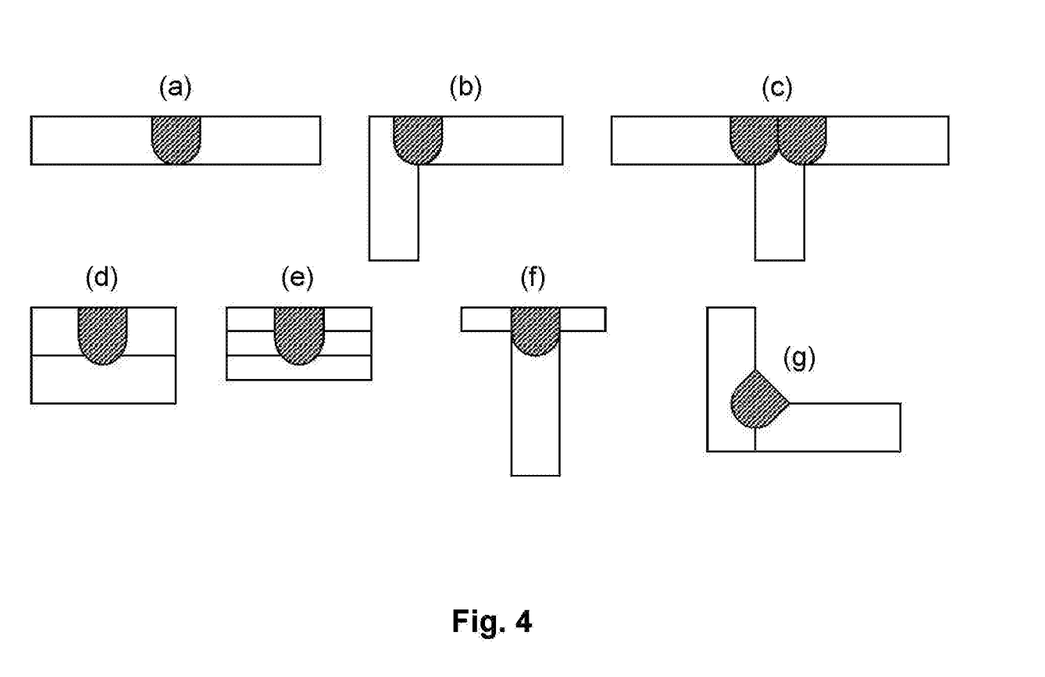
FIG. 4 schematically depicts joint configurations for FSW: (a) square butt; (b) edge butt; (c) T butt joint; (d) lap joint; (e) multiple lap joint; (f) T lap joint; and (g) fillet joint.

FIG. 4 schematically depicts joint configurations for FSW: (a) square butt; (b) edge butt; (c) T butt joint; (d) lap joint; (e) multiple lap joint; (f) T lap joint; and (g) fillet joint.

Figure 5A:
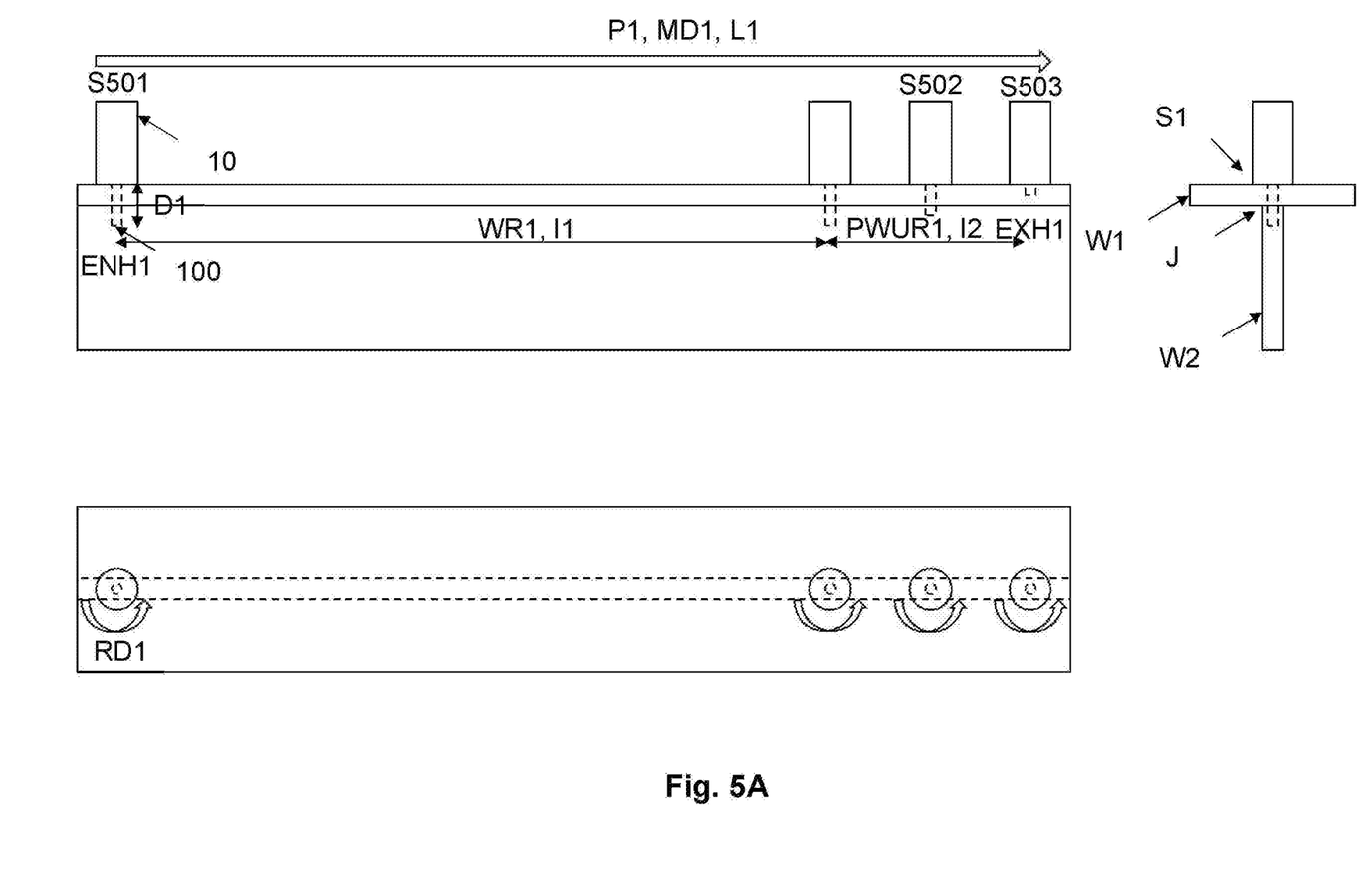
FIGS. 5A and 5B schematically depicts a method of friction stir welding, according to an exemplary embodiment.
Figure 5B:
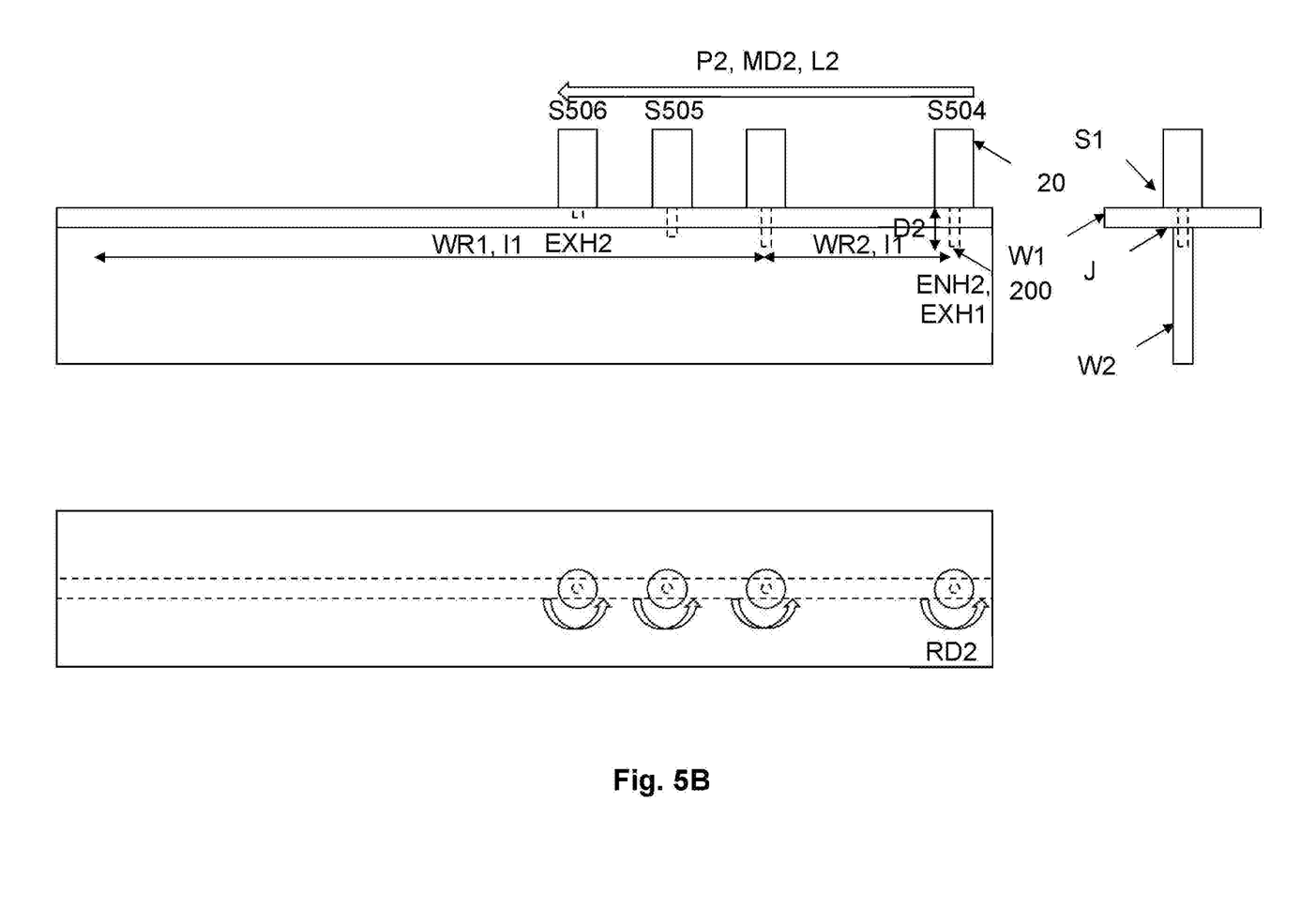

FIGS. 5A and 5B schematically depict a method of friction stir welding, according to an exemplary embodiment. Particularly, FIG. 5A schematically depicts a first pass of FSW and FIG. 5B schematically depicts a second pass of FSW. FIGS. 5A and 5B show side elevation, front elevation and plan views, as understood by the skilled person.

The method is of friction-stir welding, FSW, a joint J, for example a T joint and/or a lap joint, between a first workpiece W1 and a second workpiece W2, the method comprising:

performing a first pass P1 of FSW of the joint J by moving therealong a first tool 10, comprising a first probe 100 rotating in a first rotational direction RD1, in a first movement direction MD1 defining a first line L1, on a first side S1 of the joint J, comprising: inserting the first probe 100 to a first depth D1, thereby providing a first welded region WR1 (S501); withdrawing partially the first probe 100, thereby providing a first partially welded and/or unwelded region PWUR1 (S502); and fully withdrawing the first probe 100, thereby resulting in a first exit hole EXH1 (S503);

performing a second pass P2 of FSW of the joint J by moving therealong a second tool 20, comprising a second probe 200 rotating in a second rotational direction RD2, in a second movement direction MD2 defining a second line L2, on the first side S1 of the joint J, comprising: inserting the second probe 200 to a second depth D2, thereby providing a second welded region WR2 (S504); optionally withdrawing partially the second probe 200 (S505); and fully withdrawing the second probe 200, thereby resulting in a second exit hole EXH2 (S506);
wherein the second welded region WR2 includes the first exit hole EXH1; and
wherein the second exit hole EXH2 is included in the first welded region WR1.

In this example, a position of the FSW, for example of the first pass P1 of FSW and of the second pass P2 of FSW, is flat.

In this example, the joint J comprises is a T lap joint.

In this example, the first rotational direction RD1 is anticlockwise, as viewed from above the first tool 10. In this example, the first movement direction MD1 is a first translational direction. In this example, the first line L1 is linear. In this example, the first welded region WR1 extends along a first length l1 of the first line L1. In this example, the first line L1 is coincident with the joint J.

In this example, inserting the first probe 100 to the first depth D1 results in a first entry hole ENH1. In this example, the method comprises moving the first tool 10 in the first movement direction MD1 from the first entry hole ENH1 towards and/or to the first exit hole EXH1, for example at a first speed.

In this example, the second line L2 is coincident with the joint J. In this example, the second line L2 is coincident with the first line L1. In this example, the seconded welded region WR2 extends along a first length l2 of the second line L2. In this example, the first length l1 of the second line L2 extends fully along the second length l2 of the first line L1.

In this example, withdrawing partially the first probe 100 comprises gradually, for example linearly as a function of distance and/or time, withdrawing partially the first probe 100. In this example, withdrawing partially the first probe 100 comprises withdrawing the first probe 100 by an amount of at least 75% of the first depth D1. In this example, the first partially welded and/or unwelded region PWUR1 extends along a second length l2 of the first line L1.

In this example, withdrawing partially the first probe 100 comprises withdrawing the first probe 100 from the first depth D1 while moving the first tool 10 in the first movement direction MD1.

In this example, the second rotational direction RD2 is anticlockwise, as viewed from above the second tool 20. In this example, the second movement direction MD2 is a second translational direction. In this example, the second line L2 is linear. In this example, the first rotational direction RD1 and the second rotational direction RD2 are the same rotational direction, both anticlockwise.

In this example, inserting the second probe 200 to the second depth D2 results in a second entry hole ENH2. In this example, the method comprises moving the second tool 20 in the second movement direction MD2 from the second entry hole ENH2 towards and/or to the second exit hole EXH2, for example at a second speed.

In this example, inserting the second probe 200 to the second depth D2 comprises inserting the second probe 200 proximal to and/or into the first exit hole EXH1.

Performing the second pass P2 of FSW comprises optionally withdrawing partially the second probe 200. In this example, withdrawing partially the second probe 200 comprises gradually, for example linearly as a function of distance and/or time, withdrawing partially the second probe 200. In this example, withdrawing partially the second probe 200 comprises withdrawing the second probe 200 by an amount at least 75% of the second depth D2.

In this example, withdrawing partially the second probe 200 comprises withdrawing the second probe 200 from the second depth D2 while moving the second tool 20 in the second movement direction MD2.

In this example, the first depth D1 and the second depth D2 are similar, for example the same.

In this example, the second movement direction MD2 is directly opposed to the first movement direction MD1. In this example, the second line L2 is fully coincident with the first line L1.

In this example, the first welded region WR1 is included in the second welded region WR2. In this example, the first partially welded and/or unwelded region PWUR1 is included in the second welded region WR2.

In this example, the first tool 10 and the second tool 20 comprises a rotating shoulder. In this example, the first probe 100 a straight cylindrical probe.

In this example, the second tool 20 is the first tool 10.

In this example, the first workpiece W1 and the second workpiece W2 comprises a 2XXX aluminium alloy.

In this example, the first workpiece W1 and/or the second workpiece W2 has a thickness in a range from 0.5 mm to 25 mm, preferably in a range from 1.6 mm to 20 mm, more preferably in a range from 2 mm to 15 mm. In this example, the first workpiece W1 is a skin of an aircraft and the second workpiece W2 is a spar or a rib.

FIGS. 5A and 5B also schematically depict an apparatus A for friction stir welding, according to an exemplary embodiment.

The apparatus A is for friction-stir welding, FSW, a joint J, for example a T joint and/or a lap joint, between a first workpiece W1 and a second workpiece W2. The apparatus comprises a first tool 10, comprising a first probe 100 rotatable in a first rotational direction RD1 and insertable into the first workpiece W1 and/or into the second workpiece W2 to a first depth D1 and withdrawable therefrom, moveable in a first movement direction MD1 defining a first line L1, for performing a first pass P1 of FSW of the joint J by moving therealong thereby providing a first welded region WR1, a first partially welded and/or unwelded region PWUR1 and a first exit hole EXH1; and
a second tool 20, comprising a second probe 200 rotatable in a second rotational direction RD2 and insertable into the first workpiece W1 and/or into the second workpiece W2 to a second depth D2 and withdrawable therefrom, moveable in a second movement direction MD2 defining a second line L2, for performing a second pass P2 of FSW of the joint J by moving therealong thereby providing a second welded region WR2 and a second exit hole EXH2;
wherein the second welded region WR2 includes the first exit hole EXH1; and
wherein the second exit hole EXH2 is included in the first welded region WR1.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of friction-stir welding, FSW, a joint between a first workpiece and a second workpiece, the method comprising:
    performing a first pass of FSW of the joint by moving therealong a first tool, the first tool comprising a first probe rotating in a first rotational direction, in a first movement direction defining a first line, on a first side of the joint, comprising: inserting the first probe to a first depth, thereby providing a first welded region; withdrawing partially the first probe, thereby providing a first partially welded and/or unwelded region; and fully withdrawing the first probe, thereby resulting in a first exit hole;
    performing a second pass of FSW of the joint by moving therealong the first tool or a second tool, the second tool comprising a second probe rotating in a second rotational direction, in a second movement direction defining a second line, on the first side of the joint, comprising: inserting the first or second probe to a second depth, thereby providing a second welded region; and fully withdrawing the first or second probe, thereby resulting in a second exit hole;
    wherein the second welded region includes the first exit hole;
    wherein the second exit hole is included in the first welded region;
    wherein withdrawing partially the first probe comprises withdrawing the first probe from the first depth while moving the first tool in the first movement direction;
    wherein inserting the first or second probe to the second depth comprises inserting the first or second probe proximal to and/or into the first exit hole; and
    wherein the second welded region includes the first partially welded and/or unwelded region.

2. The method according to claim 1, wherein withdrawing partially the first probe comprises withdrawing the first probe by an amount of at least 50%.

3. The method according to claim 1, wherein withdrawing partially the first probe from the first depth while moving the first tool in the first movement direction comprises linearly, as a function of distance and/or time, withdrawing partially the first probe.

4. The method according to claim 1, wherein the joint is a T joint or a lap joint.

5. The method according to claim 1, comprising withdrawing the second probe from the second depth while moving the second tool in the second movement direction.

6. The method according to claim 1, wherein the first welded region is included in the second welded region.

7. The method according to claim 1, wherein the second movement direction is opposed to the first movement direction.

8. The method according to claim 1, wherein the second line is at least partially coincident with the first line.

9. The method according to claim 1, wherein the first tool and/or the second tool comprises a rotating shoulder or a stationary shoulder.

10. The method according to claim 1, wherein the second pass of FSW of the joint is performed using the first tool.

11. The method according to claim 1, wherein the first workpiece and/or the second workpiece comprises an aluminium alloy, a titanium alloy, a copper alloy, and/or a steel.

12. The method according to claim 1, wherein the first workpiece and/or the second workpiece has a thickness in a range from 0.5 mm to 25 mm.

13. A method of manufacturing a component, preferably an aircraft component, comprising the method of friction-stir welding, FSW, a joint between a first workpiece and a second workpiece, according to claim 1.

14. The method according to claim 1, wherein the second pass of FSW of the joint is performed using the second tool.

* * * * *